United States Patent
Freitas et al.

(10) Patent No.: US 11,926,481 B2
(45) Date of Patent: Mar. 12, 2024

(54) ROBOT DEVICE, AND METHOD FOR INSPECTION OF COMPONENTS OF A BELT CONVEYOR

(71) Applicants: VALE S.A., Rio de Janeiro (BR); UNIVERSIDADE FEDERAL DO RIO DE JANEIRO—UFRJ, Rio de Janeiro (BR)

(72) Inventors: Gustavo Medeiros Freitas, Ouro Preto (BR); Marcos Paulo Torre, Mariana (BR); Gabriel Carvalho Garcia, Ouro Preto (BR); Filipe Augusto Santos Rocha, Ouro Preto (BR); André Stanzani Franca, Vitória (BR); Felipe Ribeiro Da Fonseca, Vitória (BR); Fernando Cesar Lizarralde, Rio de Janeiro (BR); Ramon Romankevicius Costa, Rio de Janeiro (BR); Alex Fernandes Neves, Rio de Janeiro (BR); João Carlos Espiúca Monteiro, Rio de Janeiro (BR)

(73) Assignees: VALE S.A., Rio de Janeiro (BR); UNIVERSIDADE FEDERAL DO RIO DE JANEIRO—UFRJ, Rio de Janeiro (BR)

( * ) Notice: Subject to any disclaimer, the term of this patent is extended or adjusted under 35 U.S.C. 154(b) by 521 days.

(21) Appl. No.: 17/056,622

(22) PCT Filed: Mar. 19, 2019

(86) PCT No.: PCT/BR2019/050090
§ 371 (c)(1),
(2) Date: Nov. 18, 2020

(87) PCT Pub. No.: WO2019/218035
PCT Pub. Date: Nov. 21, 2019

(65) Prior Publication Data
US 2021/0206579 A1    Jul. 8, 2021

(30) Foreign Application Priority Data

May 18, 2018 (BR) .......................... 1020180102133

(51) Int. Cl.
*B25J 5/00* (2006.01)
*B25J 19/02* (2006.01)
*B65G 43/02* (2006.01)

(52) U.S. Cl.
CPC .............. *B65G 43/02* (2013.01); *B25J 5/005* (2013.01); *B25J 5/007* (2013.01); *B25J 19/022* (2013.01); *B25J 19/023* (2013.01); *B25J 19/026* (2013.01)

(58) Field of Classification Search
CPC ........ B25J 5/007; B25J 19/023; B25J 19/022; B25J 19/026; B25J 5/005; B65G 43/02; B65G 39/10; B65G 15/00; B65G 43/00
See application file for complete search history.

(56) References Cited

U.S. PATENT DOCUMENTS 6,237,752 B1   5/2001  El-Ibiary
6,484,083 B1 * 11/2002 Hayward ............... B60D 1/246
                                                    700/262

(Continued)

FOREIGN PATENT DOCUMENTS

JP   2016145111 A   8/2016

OTHER PUBLICATIONS

Almurib et al., A review of application industrial robotic design, 2012, IEEE, p. 105-112 (Year: 2012).*

(Continued)

*Primary Examiner* — McDieunel Marc
(74) *Attorney, Agent, or Firm* — ARENTFOX SCHIFF LLP

(57) ABSTRACT

Aspects include a robotic device for inspection of components of a belt conveyor comprising a mobile platform and
(Continued)

a robotic arm having a first end coupled to the mobile platform and a second end, the robotic arm configured to guide the second end to contact at least one of the components of the belt conveyor. Further included is a method for inspecting components of a belt conveyor using a robotic device, including: obtaining temperature and/or noise data of at least one of the components of the belt conveyor; and, if the data are outside a range, then: driving a second end a robotic arm of the robotic device for contacting at least one of the components; and obtaining vibration data from at least one of the components.

16 Claims, 2 Drawing Sheets

(56) References Cited

U.S. PATENT DOCUMENTS

| | | | | |
|---|---|---|---|---|
| 6,678,583 | B2* | 1/2004 | Nasr | B25J 9/046 |
| | | | | 414/217 |
| 7,139,651 | B2* | 11/2006 | Knowlton | G01S 19/50 |
| | | | | 701/472 |
| 7,346,429 | B2* | 3/2008 | Goldenberg | G08C 17/00 |
| | | | | 318/568.13 |
| 7,539,557 | B2* | 5/2009 | Yamauchi | G05D 1/027 |
| | | | | 700/262 |
| 2013/0231779 | A1 | 9/2013 | Purkayastha et al. | |
| 2016/0152416 | A1 | 6/2016 | Staab et al. | |

OTHER PUBLICATIONS

Tamura et al., High speed intelligent handling robot for food and pharmaceutical products, 2010, IEEE, p. 60-64 (Year: 2010).*
Zom et al., A Novel Telemanipulated Robotic Assistant for Surgical Endoscopy: Preclinical Application to ESD, 2017, IEEE, p. 797-808 (Year: 2017).*
Minca et al., New approach in control of assembly/disassembly line served by robotic manipulator mounted on mobile platform, 2012, IEEE, p. 235-240 (Year: 2012).*
Gudmundsson et al., Tuning Robotic Part Feeder Parameters to Maximize Throughput, 1997, IEEE, p. 2440-2445 (Year: 1997).*
International Search Report issued in corresponding International Application No. PCT/BR2019/050090 dated Jun. 24, 2019.

* cited by examiner

ROBOT DEVICE, AND METHOD FOR INSPECTION OF COMPONENTS OF A BELT CONVEYOR

This application is a 35 U.S.C. § 371 National Phase of PCT Application No. PCT/BR2019/050090, filed Mar. 19, 2019, which claims priority to Brazilian Application No. BR1020180102133 filed May 18, 2018, the disclosures of which are hereby incorporated by reference in their entireties.

TECHNICAL FIELD

The present invention is related to the inspection of belt conveyors. More specifically, the present application relates to a robotic device to inspect components of a belt conveyor.

DESCRIPTION OF THE STATE OF THE ART

Belt conveyors are used in several kinds of industries. Such conveyors typically have rotating components, such as rollers and drums, and wear-resistant components, such as belts, scrapers, and chute linings. These belt conveyors' components suffer damages throughout their useful life, in general, caused by misalignment, friction, abrasion, erosion, wear generated by material displacement, and extreme conditions of the environment in which they operate.

Defects in rotating components can be detected and monitored, for example, by measuring noise and vibration of transmission shafts and bearings, and also by measuring the temperature of the transmission shafts, housings, and bearings. Wear-resistant components' failures can be identified and monitored, for example, by image, laser scanning, and ultrasound.

Generally, belt conveyors and their components are periodically inspected by operators who move through accesses installed along with the belts. This inspection operation depends substantially on the operator's knowledge and sensitivity. He must detect and recognize noise and vibrations that typically indicate some anomalous behavior. Regarding the measurement of temperatures, instruments such as pyrometers and thermal cameras are often used.

Some characteristics of belt conveyors hampers the inspection activities by operators, such as the extensive dimensions of the belts, the high quantity of components to be measured, and the existence of access restrictions in certain components. Another factor that affects the quality of inspection of these conveyors is the fact that these operations are carried out, in general, in the open pit, which generates tiredness and cognitive reduction of the operators, as they need to travel for long distances under bad weather.

In this context, robotic devices for inspecting belt conveyors are known in the prior art. Document WO2015/009467 reveals a method for inspecting conveyor belts using an unmanned vehicle moving on one side of the belt, carrying a sensor structure, including RGB, thermal and infrared cameras, and acoustic instruments. The proposed unmanned vehicle can be air or land type, using wheels or tracks. The sensor structure can be installed on the vehicle using a pan & tilt mechanism, installed directly on the vehicle, or attached to a robotic arm. The vehicle can be teleoperated or autonomously controlled, in this case, using GPS-based navigation. However, the vehicle described by this prior art document does not explicit the use of an articulated robotic arm comprising vibrations sensors at its end to inspect the components of the conveyor through mechanical contact, preventing the acquisition of accurate vibrational data from the operation of the belts conveyor. Nor does this document explain how the ground vehicle's locomotion mechanism is.

Also, certain conveyors' components may be located in locations with visual obstruction concerning the position of the unmanned vehicle of WO2015/009467. In these cases, the sensors positioned on the vehicle could not obtain accurate readings of such components.

Industrial environments are often aggressive and generally have uneven terrain with several obstacles, such as stairs, rails, and unevenness. Thus, it is of great relevance that the land vehicle has an efficient locomotion system for this type of terrain.

Therefore, it is necessary the development of a robotic device that is capable of measuring vibrations of belt conveyor components through a mechanical contact between vibration sensors and such conveyor components, in addition to being able to obtain accurate readings of conveyor components when these are located in places that are difficult to access or view.

There is also a need for a robotic device that has a versatile and efficient locomotion system, which allows it to access all operational areas of the industrial plant.

PURPOSES OF THE INVENTION

The purpose of the present invention is to provide a robotic device that can measure temperature, noise, and vibration of a belt conveyor's components.

The present invention aims to provide a robotic device capable of obtaining accurate measurements of conveyor components' operating conditions when they are located in places that are difficult to access or view.

Another objective of the present invention is to provide a method for inspecting a belt conveyor's components using a robotic device that can measure temperature, noise, and vibration of such components.

BRIEF DESCRIPTION OF THE INVENTION

The present invention discloses a robotic device for inspection of components of a belt conveyor comprising a mobile platform and a robotic arm having a first end coupled to the movable platform (2) and a second end (5); The robotic arm comprises an articulated structure configured to conduct its second end to contact at least one of the belt conveyor components. The robotic device comprises a vibration sensor coupled to the second end of the arm in order to make it possible to measure the vibration of the components of a belt conveyor.

The present invention also discloses a method for inspecting components of a belt conveyor using a robotic device, comprising the step of: obtaining temperature and/or noise data of at least one of the components of the belt conveyor; and, if the temperature and/or noise data of at least one of the components are outside a predetermined range of values, the method further comprises the steps of: driving the second end of a robotic arm of the robotic device for contacting at least one of the components of the belt conveyor, in which the robotic arm comprises an articulated structure; and obtaining vibration data from at least one of the components through the vibrations sensor.

BRIEF DESCRIPTION OF THE FIGURES

The figures related to this invention are briefly described, as shown below.

DETAILED DESCRIPTION

The following description starts from a preferred embodiment of the invention, applied to a robotic device and a method for components inspection of a belt conveyor.

The present invention features a robotic device for inspection of components of a belt conveyor comprising a mobile platform with wheels and tracks for locomotion, and a robotic arm having a first end coupled to the mobile platform and a second end, in which the robotic arm comprises an articulated structure configured to guide the second end to contact at least one of the components of the belt conveyor and where the robotic device comprises a vibration sensor coupled to the second end of the arm.

Figure 1:
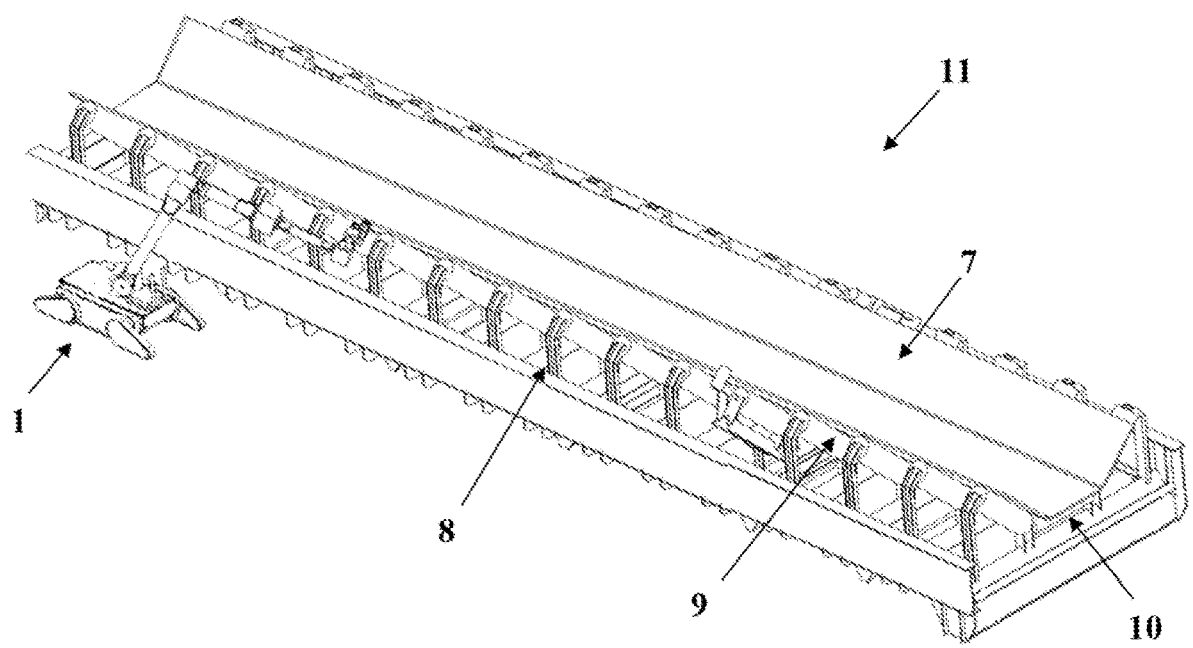
FIG. 1—Robotic device performing an inspection in components of a conveyor belt.

FIG. 1 schematically illustrates how the robotic device 1 can perform operations inspection in belt conveyors 11. Belt conveyor 11 preferably comprises an endless sling 7, which is extended between two drive drums (not shown), being one drive and the other return, and an internal structure including laminated profiles and juxtaposed rollers, installed on trestles 8, over which the sling 7 slides, to allow the transfer of the ore positioned on the belt.

Preferably, each trestle 8 supports three rollers, two of which are external rollers 9 and installed at an angle and an internal roll 10 installed parallel to the horizontal plane. During the operation of the belt conveyor 11, the drive drums are rotated to move the sling 7, consequently generating a rotation of the rollers 9, 10, whose axes comprise bearings supported on trestles supports 8.

Figure 2:
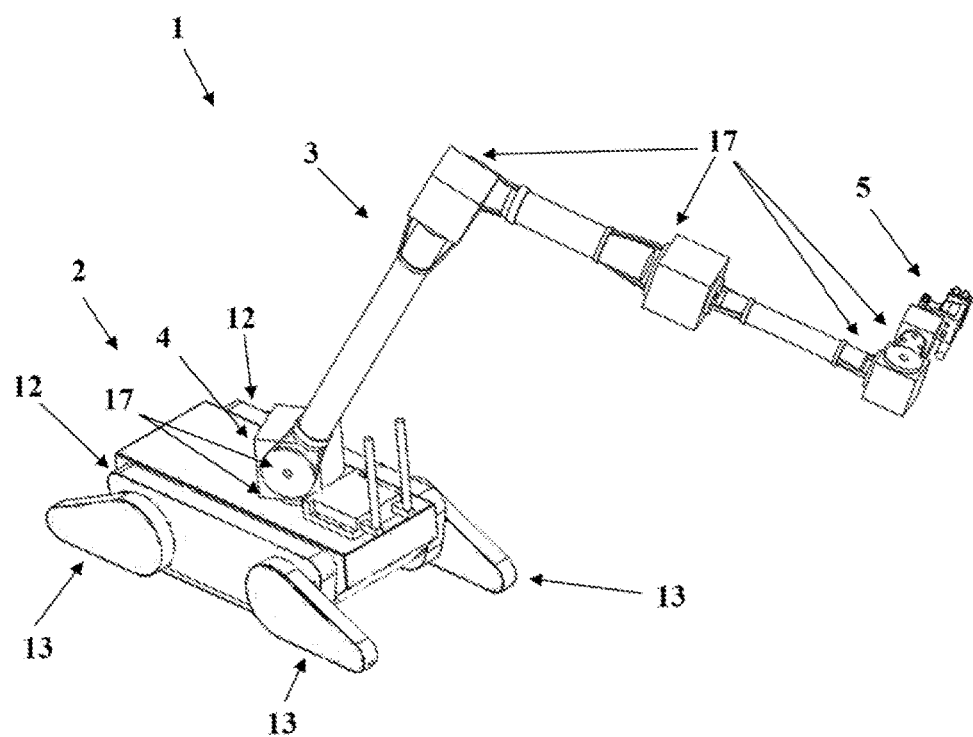
FIG. 2—View in perspective of the robotic device for inspection of components of a belt conveyor.

FIG. 2 schematically illustrates a robotic device for the inspection of components of a belt conveyor.

The present invention discloses a robotic device 1 comprising a mobile platform 2 and a robotic arm 3 having a first end 4 coupled to the movable platform (2) and a second end (5); The robotic arm 3 of the device 1 comprises an articulated structure capable of articulating itself to guide the second end 5 to reach or contact a point of interest, such as one of the components 8, 9 10 of the belt conveyor 11. The robotic device 1 further comprises a vibration sensor 6 coupled to the second end 5 of the arm 3.

Preferably, the mobile platform 2 comprises wheels and tracks 12, and lever arms 13 to allow the robotic device 1 to move through accesses of the belt conveyor 11 and overcome obstacles. The lever arms 13 can also be operated individually, allowing the robotic device 1 to ascend and descend stairs typically present along with the accesses. The wheels and tracks 12 of the mobile platform 2 allow the robotic device 1 to travel on different terrains, such as paving, soil, mud, grids, and metal sheets and floors covered with pellets. Alternatively, the mobile platform 2 has articulated lever arms 13 also equipped with tracks, optimizing the overcoming of obstacles and the climbing and descending of stairs. The robotic device 1 preferably has an internal power source, and its communication with the command base is carried out wirelessly, not requiring it to be connected to cables during inspections.

Furthermore, the robotic arm's articulated structure preferably comprises a plurality of joints 17 configured to define a position and orientation of the robotic arm 3 and the sensors coupled to it. Preferably, the robotic arm 3 has at least six degrees of freedom to define the sensor set's position and orientation in the three-dimensional environment. For example, the robotic arm 3 comprises six joints 17 that can have redundancies in certain freedom degrees.

Figure 3:
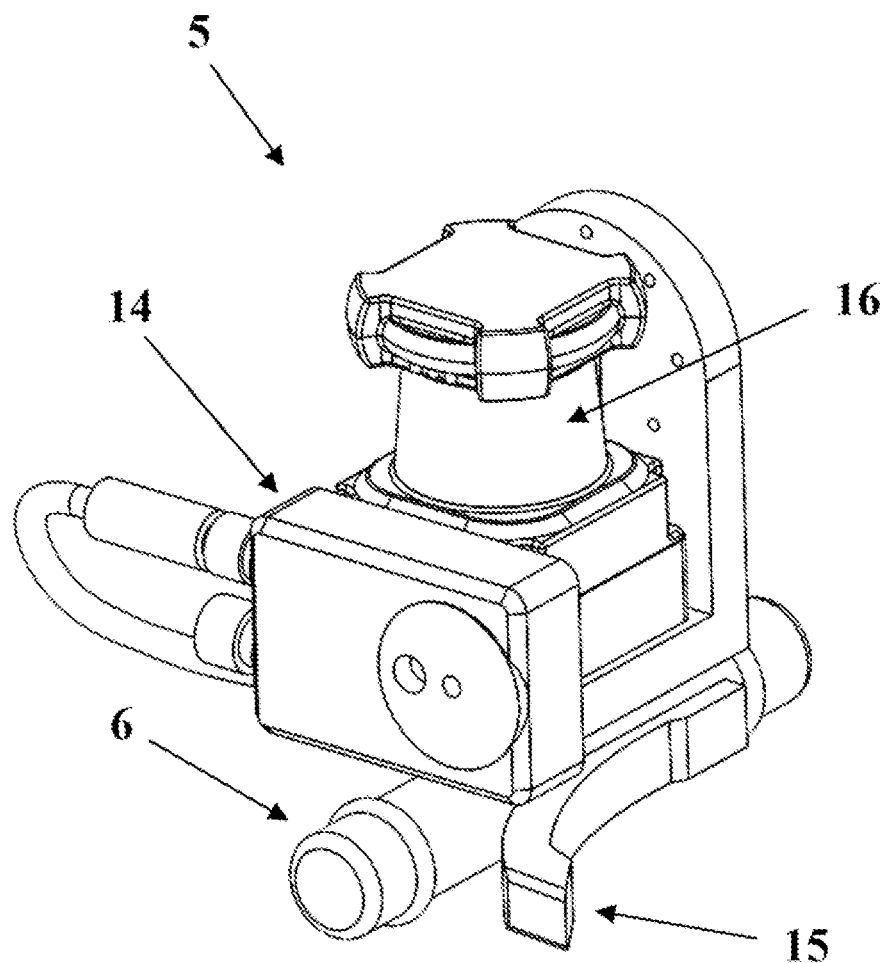
FIG. 3—Set of sensors of the robotic device for inspection of components of a belt conveyor.

FIG. 3 illustrates another preferred embodiment of the present invention, in which a set of sensors is coupled to the second end 5 of the robotic arm 3.

In the preferred embodiment of FIG. 3, the robotic device 1 also comprises a measuring tip coupled to the vibrations sensor 6.

Alternatively, the robotic device 1 additionally comprises one or more of: at least one camera 14, a microphone 15, encoders, a global positioning system (GPS), an inertial sensor, and depth cameras to allow semi-autonomous or autonomous navigation of this robotic device 1. These sensors can be attached to the mobile platform 2 or attached along the robotic arm 3, including its second end 5. In this case, by moving arm 3, it is possible to reposition and reorient the set of sensors used for navigation. Preferably, there is at least one RGB or thermal type camera 14.

According to the embodiment of FIG. 3, the robotic arm 3 is also configured so that at least one camera 14 can provide images of the components of the belt conveyor 11. In a situation where it is not necessary to measure the components' vibration by contacting the vibration sensor 6 with one of the components 8, 9, 10 of the belt conveyor 11, the robotic device 1 can operate in a non-contact mode. In this case, after reaching a proper configuration of the position and orientation of the mobile platform 2 and the robotic arm 3, the robotic device 1 moves along the access obtaining image data, through the RGB camera, temperature, through the thermal camera, and through the microphone 15 of the components of the belt conveyor 11. This data can be processed in real-time (during the inspection operation) by the robot's onboard computer or also stored on physical media in the command base for post-processing.

The noise measurement allows monitoring the operating conditions of the rotating components of the belt conveyor 11 throughout its useful life, for example. The temperature data obtained by the robotic device 1 can indicate the imminence of problems such as fire on the conveyor belt 11. In situations like this, the robotic device 1 of the present invention allows a quick decision to verify and solve the problem.

Analogously, the images captured by the RGB cameras or by the laser scanner 16 can be used to identify the integrity of the surface and wear condition of the components of the belt conveyor 11. These images also allow analyzing and monitoring the rate of wear over these components' life and to optimize the planning of preventive maintenances.

Preferably, all inspection data obtained through the robotic device 1 also have geolocation and timestamp information and can be used to monitor bearings' operational conditions, thus enabling the early prediction of failures.

Preferably, the sensors used for navigation of the robotic device 1 obtain information about the environment around it, especially concerning the presence of free access areas and obstacles within its working space. This information can also assist in the path planning of mobile platform 2 and robotic arm 3.

The data obtained by this set of sensors can also be used to inspect conveyor belts 7, particularly to verify the supporting structures' operational conditions.

In situations in which some type of anomaly related to the temperature or noise data obtained from the components of the belt conveyor 11, for example of the rollers, is detected, the robotic device 1 can perform a thorough inspection of this region of interest through vibration measurements via direct physical contact with the belt conveyor structure.

Under the present invention, these vibration measurements are carried out through direct physical contact of the sensor located on the second end 5 of a robotic arm 3 of the robotic device 1 with at least one of the components of the belt conveyor 11, for example, on support or structure, or also by directly touching an axis of the roller.

In the preferred embodiment illustrated in FIG. 3, to assist the guidance of the robotic arm 3, the robotic device 1 also comprises a laser scanner 16 coupled to the second end 5 of the arm 3. Laser scanner arm 16 has the advantageous function to generate a three-dimensional point cloud of the region of interest of the belt conveyor 11.

Additionally, the generation of the three-dimensional point cloud of the region of interest of the belt conveyor 11 can be supported by stereo cameras of depth or Time of Flight (ToF). Then, a specific point in the region of interest to be contacted is selected manually or automatically. Finally, the path of the robotic arm 3 is planned so that the measuring tip coupled to the sensor approaches in the normal direction to the surface to be measured, avoiding collisions with obstacles present in the environment. After contact, the structure's vibration is measured using a vibration sensor 6 attached to the tip. The obtained vibration data can be used, for example, to detect a problem in conveyor 11 and also serve as a parameter to monitor the operation of a certain component of this conveyor throughout its useful life.

The robotic device 1 preferably has a high degree of protection, including resistance to dust, high-pressure water jets and impacts, enabling its operation in hostile environments, including mining. This protection level comes from the characteristic of the electronic and mechanical components being installed inside the housing of the robotic device 1, which is constructed of hydrophobic metals and polymers and using seals, o-rings, and seals. Similarly, components that are not incorporated into the robotic device's housing are also built encapsulated in housings with the same constructive characteristics as those installed inside the housing.

The present invention also discloses a method for inspecting components of a belt conveyor using a robotic device, comprising the step of: obtaining temperature and/or noise data from at least one of the components of the belt conveyor; and, if the temperature data (for example, temperatures greater than 50° C. may indicate damage to the roller) and/or noise (such as abnormal noise emission patterns) from at least one of the components are out of range of predetermined values, the method further comprises the steps of: driving the second end of a robotic arm of the robotic device to physically contact at least one of the components of the belt conveyor, in which the robotic arm comprises an articulated structure; and obtain vibration data for at least one of the components through the vibrations sensor.

FIG. 1 illustrates the situation where the robotic device 1 possibly identified that the temperature and/or noise data of at least one of the components are outside a predetermined range of values and is operated to perform the vibration detection step through physical contact. At this time, the robotic device 1 moves to a conveyor 11 access, and then the robotic arm 3 is configured to drive its second end 5 to contact at least one of the components 8, 9, 10 of the belt conveyor 11 to obtain data of vibration.

Under the preferred embodiment illustrated in FIG. 3, the robotic device comprises a laser scanner 16 coupled to the second end 5 of the arm 3. The process includes generating a three-dimensional point cloud of the region of interest through the laser scanner. The scanner information guides the robotic arm 3 to a region of interest to be reached by the vibration sensor 6.

Preferably the driving step of the robotic arm 3 comprises selectively driving the articulated structure of the arm 3 of the robotic device 1, which can comprise a plurality of joints 17.

Preferably, driving the robotic arm 3 comprises physically contacting a measuring tip coupled to the vibrations sensor 6 at least one of the components 8, 9, 10 of the belt conveyor 11.

For the movement of the robotic device 1 for positioning and driving the robotic arm 3, it is preferable to have wheels and tracks 12, which can be activated to position the mobile platform 2 of the device. The mobile platform 2 of the robotic device 1 should also be provided with lever arms 13, which can assist robotic device movement 1 through different terrains, such as paving, soil, mud, grids and metal sheets, and floors covered with pellets.

Thus, the present invention solves the technical problem of measuring vibrations in components of a belt conveyor. To this end, the present invention uses a robotic device 1 having a robotic arm 3 with an articulated structure that leads the second end 5 of the arm 3 to contact at least one component of the belt conveyor 11, obtaining vibration data from at least one component through of the vibration sensor 6 coupled to the second end 5 of the arm.

The present invention is especially advantageous since it can include several additional sensors, such as RGB cameras, laser scanner, inertial sensor, and depth cameras. As the robotic arm 3 has an articulated structure, the robotic device can move its robotic arm in a determined number of positions to better position the sensors coupled along the robotic arm. Such configuration can allow readings with greater precision and readings from components that can be located in places of difficult access or view.

This allows the optimization of preventive maintenance planning of the belt conveyor's rotating components, thus avoiding the need for unscheduled stops of the conveyor belts. It also reinforces that the present invention is not limited to the particular configurations/embodiments described above.

The invention claimed is:

1. Robotic device for inspecting components of a conveyor belt, comprising:
   one mobile platform; and
   one robotic arm having a first end coupled to the movable platform and a second end;
   wherein the robotic arm comprises an articulated structure configured to conduct the second end to contact at least one of the components of the belt conveyor and
   wherein the robotic device comprises a vibration sensor attached to the second end of the arm.

2. The robotic device according to claim 1, wherein the robotic device further comprises a laser scanner coupled to the second end of the arm.

3. The robotic device according to claim 1, wherein the robotic device further comprises a measuring tip coupled to the vibrations sensor.

4. The robotic device according to claim 1, wherein the robotic device further comprises at least one camera, a microphone, encoders, a global positioning system (GPS), an inertial sensor and depth cameras, or any combination thereof.

5. The robotic device according to claim 4, wherein the at least one camera or the microphone are coupled to the second end of the arm.

6. The robotic device according to claim 4, wherein at least one camera is the RGB or thermal type.

7. The robotic device according to claim 1, wherein the one robotic arm comprises six rotational joints.

8. The robotic device according to claim 1, wherein the mobile platform comprises wheels and tracks.

9. The robotic device according to claim 8, wherein the mobile platform further comprises lever arms.

10. A method for inspecting components of a belt conveyor using a robotic device according to claim 1, comprising the step of:
   a) obtaining temperature and/or noise data from at least one of the components of the belt conveyor, wherein, if the temperature and/or noise data of at least one of the components are outside a predetermined range of values, the method also comprises the steps of:
   b) driving a second end of a robotic arm of the robotic device to contact at least one of the components (8, 9, 10) of the belt conveyor, in which the robotic arm comprises an articulated structure; and
   c) obtain vibration data from at least one of the components through the vibrations sensor.

11. The method according to claim 10, wherein the predetermined range of values comprises temperature values below 50° C.

12. The method according to claim 10, wherein step b) comprises:
   generating a three-dimensional point cloud of the region of interest using a laser scanner coupled to the second end of the arm.

13. The method according to claim 10, wherein step b) comprises physically contacting a measuring tip coupled to the vibrations sensor to at least one of the components of the belt conveyor.

14. The method according to claim 10, wherein step b) comprises selectively activating the articulated structure of the arm of the robotic device.

15. The method according to claim 14, wherein step b) comprises activating wheels and tracks of a mobile platform of the robotic device.

16. The method according to claim 15, wherein step b) comprises additionally activating lever arms of the mobile platform of the robotic device.

* * * * *